INVENTOR.
WALTER P. SCHMITTER
BY
ATTORNEY

Patented July 18, 1950

2,516,077

UNITED STATES PATENT OFFICE 2,516,077

GEAR SET

Walter P. Schmitter, Wauwatosa, Wis., assignor to The Falk Corporation, Milwaukee, Wis., a corporation of Wisconsin Application October 30, 1947, Serial No. 782,981

14 Claims. (Cl. 74—410)

This invention relates to gear sets.

Gear sets are today available as self-contained articles of commerce. Because of their general use in effecting operation of a driven mechanism at speeds substantially below those of the driving mechanism, they are commonly known as speed reducers, although they are also used at times to effect operation of driven mechanisms at speeds above that of the driver.

One object of the present invention is to materially increase the load transmitting capacity of gear sets of the character mentioned.

Another object is to substantially reduce the size and weight of a gear set of given load transmitting capacity.

Another object is to provide in a gear set of the character mentioned several gear trains compactly arranged and combined in a manner to insure an equal division of the total torque load between the several trains.

Other more specific objects and advantages will appear, expressed or implied, from the following description of three illustrative embodiments of the invention.

Figure 1:
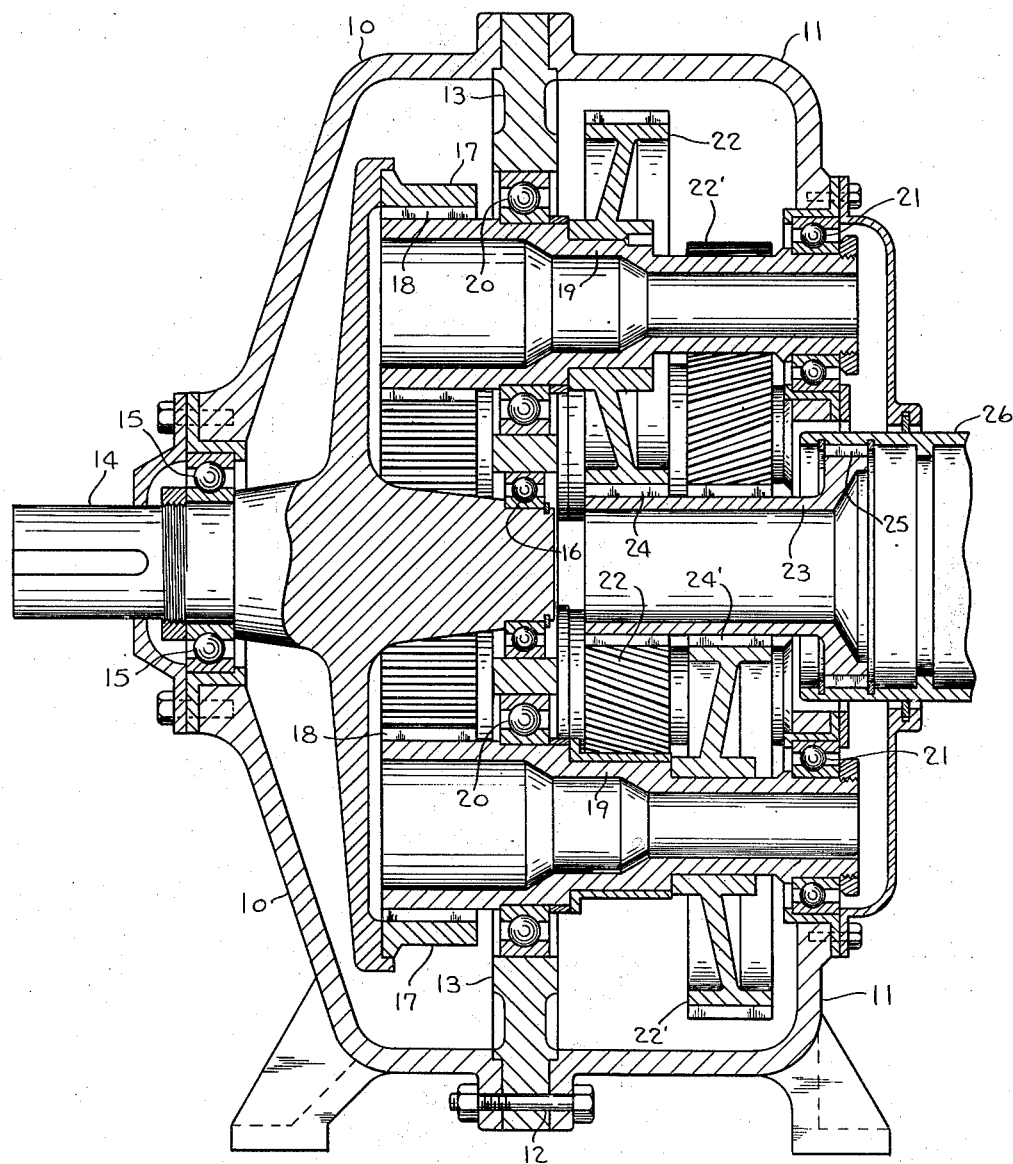
Figure 1 is a vertical sectional view of a gear set constructed in accordance with the present invention.

The gear set shown in Fig. 1 comprises a housing having a circular forward portion 10 and a separate circular rear portion 11, separably joined by bolts 12 or otherwise, with a suitable disk or spider 13 secured therebetween.

A low speed shaft 14, projects through the forward housing portion 10. This shaft is journaled in a suitable bearing 15, fixed in the housing portion 10, and in a second bearing 16, fixed in the disk 13, and carries a relatively large internal gear 17 rotatable therewith.

The gear 17 meshes with six equally spaced pinions 18 symmetrically disposed therein. The several pinions 18 are carried by separate parallel shafts 19, preferably hollow, which are shown journaled in bearings 20 fixed in the disk 13 and in bearings 21 fixed in the rear housing portion 11.

Each of the shafts 19 carries a gear 22 or 22' keyed or otherwise fixed thereto. Gears 22 constitute a symmetrical group of three equally spaced gears disposed in a common plane and respectively fixed to alternate shafts 19, while gears 22' constitute a similar group of three in a common plane offset from the first mentioned group and respectively fixed to the remaining shafts 19. For reasons which will later appear, both groups of gears 22 and 22' are of single helical type, the helix angle of those of one group being equal to but of opposite hand from those of the other group.

A high speed shaft 23, preferably hollow, carries a single helical pinion 24 that meshes with the gears 22 of one group and a second single helical pinion 24' that meshes with the gears 22' of the other group. The shaft 23 is free to float both radially and axially and is centered and positioned by the tooth reactions between the gears 22 and 22' and pinions 24 and 24'. A circular series of teeth 25 provided on the outer end of the shaft 23 provide a positive driving engagement with a similarly toothed flexible coupling member 26 of a well known type, through which the desired torque may be transmitted to or from the shaft 23 without interfering with the above described radial and axial freedom of the latter.

It will be noted that the shaft 23 is urged axially in one direction by the tooth reactions between the helical pinion 24 and the helical gears 22 of one group, and that the shaft 23 is also urged axially in an opposite direction by the tooth reaction between the helical pinion 24' and the helical gears 22' of the other group, thereby causing the shaft 23 to automatically assume an axial position such that the total tooth reactions on one pinion 24 are equal to those on the other pinion 24'. By virtue of these conditions the entire torque load transmitted through the shaft 23 is equally divided between the two pinions 24 and 24' and, consequently, each group of gears 22 and 22' automatically assumes one half of the whole transmitted load.

It will be further noted that the teeth of each of the gears 22 of one group react on the meshing pinion 24 to urge the latter radially, thereby causing the pinion 24 to automatically assume a position such as to equalize the tooth reactions between it and each of the meshing gears 22, and causing each of the three gears 22 to assume an equal one third part of the torque load transmitted through the meshing pinion 24. Similarly each of the three gears 22' of the group automatically assumes an equal one third part of the torque load transmitted through the meshing pinion 24' so that the entire torque load transmitted through the high speed shaft 24 is equally divided six ways between the six gears 22 and 22'.

Since the entire torque load is thus equally divided between the six gears 22 and 22', each of the six pinions 18 is subjected to only one sixth of the entire transmitted load.

As a consequence of this novel arrangement, each of the pinions and gears shown may be safely designed to carry only one sixth of the total transmitted load; thereby making it possible to materially reduce the size and weight of the individual elements and to obtain a compactness of design not heretofore possible. Moreover, with the gears and pinions arranged and coacting in the manner above described, a gear set of a given size and weight is capable of transmitting a much greater total torque load than was heretofore possible with gear sets of comparable size or weight.

Figure 2:
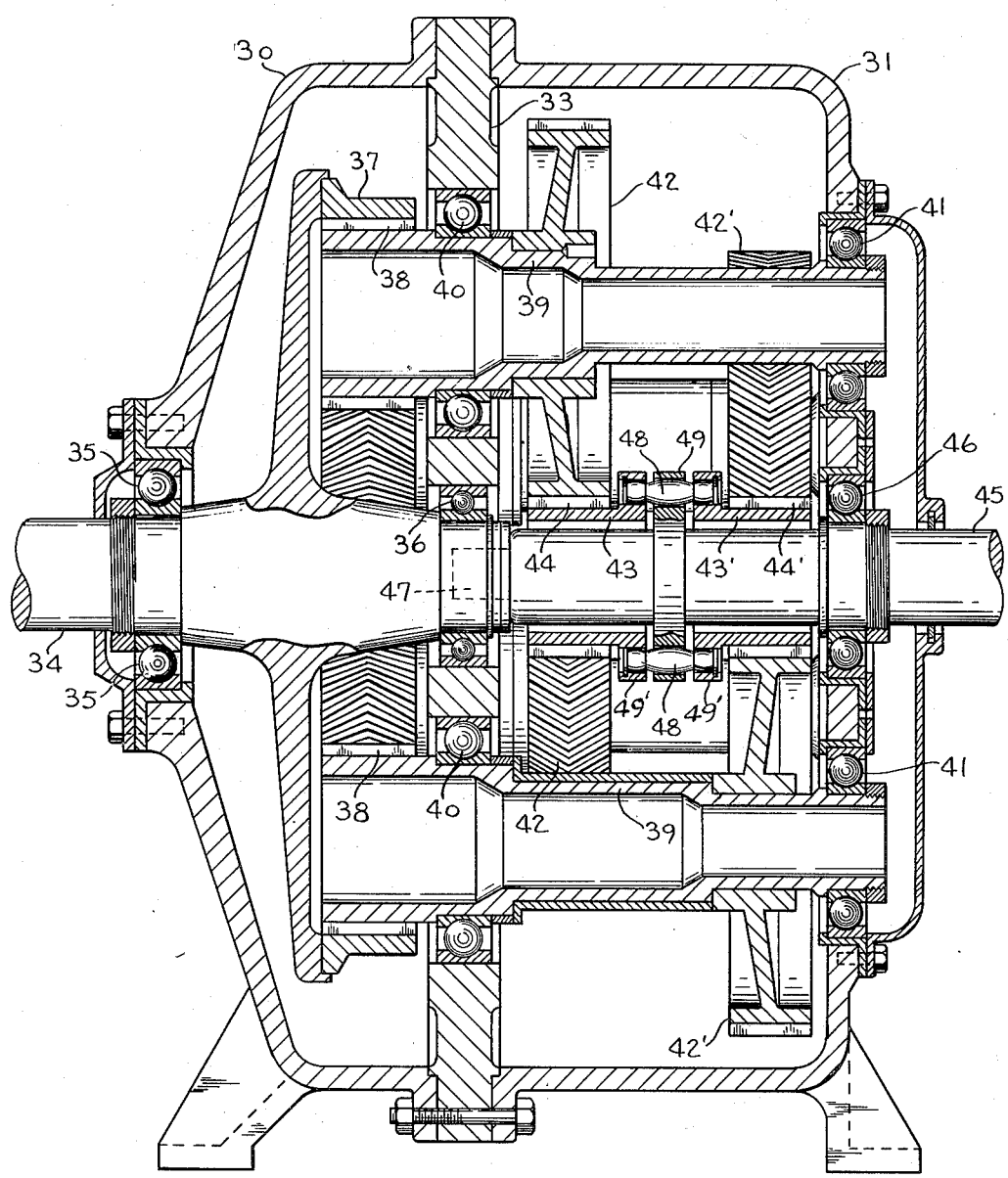
Figs. 2 and 3 are similar views of other embodiments of the invention.

The gear set shown in Fig. 2 embodies many of the advantageous features of that shown in Fig. 1, but involves structure that makes possible the use of spur or double helical gearing instead of the single helical gearing shown in Fig. 1.

The housing shown in Fig. 2, like that of Fig. 1, includes a forward section 30 detachably joined to a rear section 31, with a suitable disk or spider 33 secured therebetween. A low speed shaft 34, journaled in a bearing 35 in the forward section 30 of the housing and in a bearing 36 in the supporting disk 33, supports a large internal gear 37 rotatable therewith.

Six equally spaced pinions 38 mesh with the gear 37. Each of the pinions 38 is carried by the forward end of a shaft 39. Shafts 39 are journaled in bearings 40, fixed in the disk 33, and in bearings 41 fixed in the rear housing section 31. A group of three herring-bone gears 42, respectively keyed or otherwise fixed to alternate shafts 39, mesh with a high speed pinion 44; and a second group of three similar gears 42', respectively keyed or otherwise fixed to the remaining three shafts 39, mesh with a high speed pinion 44'.

In this instance the pinions 44 and 44' are shown carried by separate hollow shafts or sleeves 43 and 43' each of which is free to float both axially and radially. A high speed shaft 45, extending loosely through the sleeves 43 and 43', is supported largely by a bearing 46 fixed in the rear housing portion 31 and is piloted at its forward end 47 within the adjacent end of the low speed shaft 34.

The shaft 45 is shown flexibly connected in driving relation with both sleeves 43 and 43' through a plurality of pins 48 designed and arranged to insure that each pinion 44 and 44' will assume an equal one half part of the total torque load transmitted through the shaft 45. In this instance each pin 48 is rockably seated midway of its ends within a collar 49 carried by shaft 45 and with the opposite ends of each rockably seated within flanges 49' on the adjacent ends of sleeves 43 and 43', respectively. One half of the transmitted load is thus assumed by each group of gears 42 and 43'. Since each pinion 44 and 44' is free to float radially, that portion of the load transmitted through each is equally divided between the three gears 42 or 42' engaged therewith, so that each of of the gears 42 and 42' assumes an equal one sixth part of the total load, this also being true of the several pinions 38 respectively connected therewith.

The gear set of Fig. 2 thus possesses many of the advantages of that of Fig. 1, and since the Fig. 2 device does not rely upon axial displacement of gears to insure equal division of the load, gears other than single helical gears may be employed therein.

Figure 3:
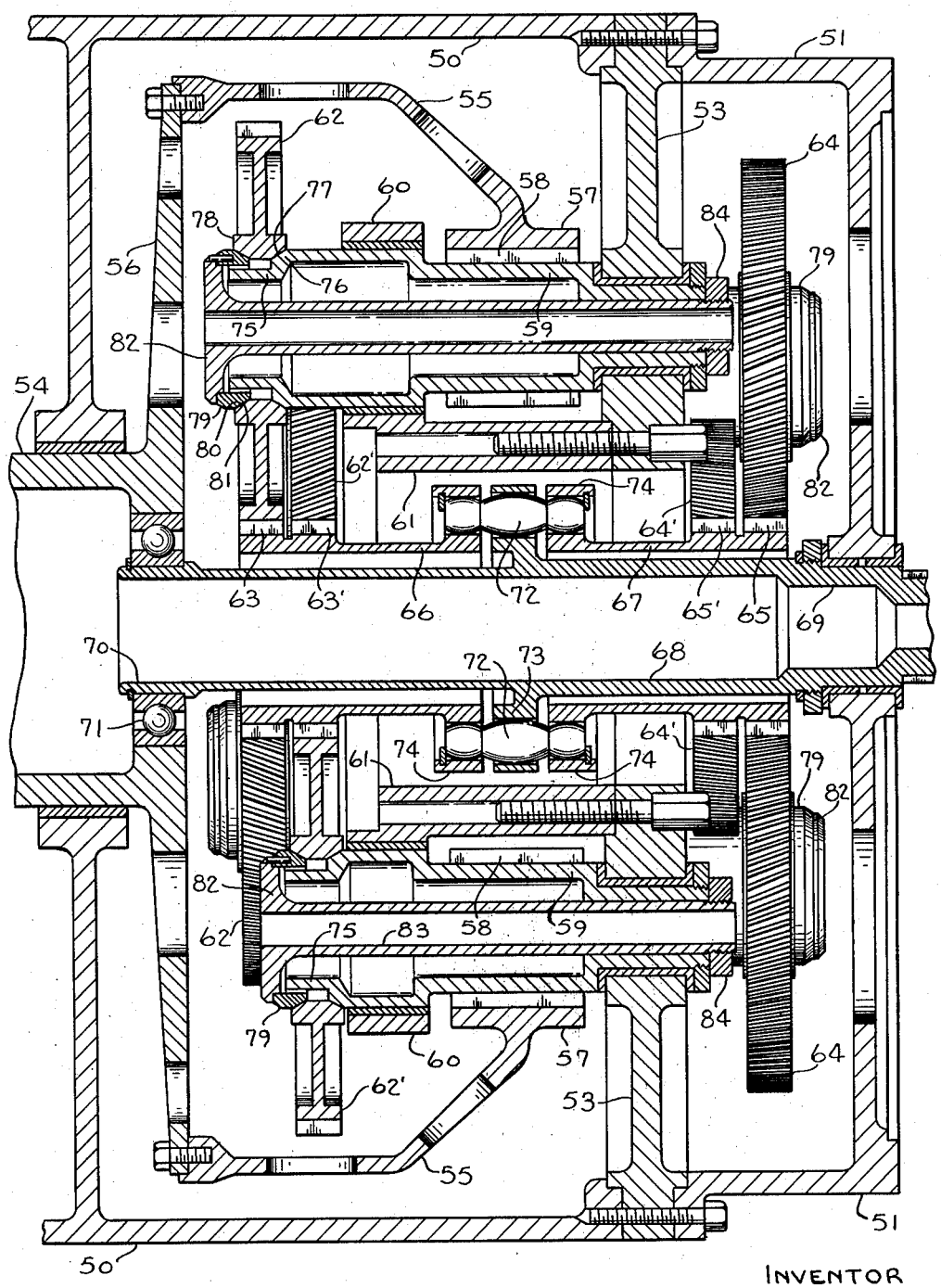

The gear set shown in Fig. 3 involves twelve gear trains so constructed and arranged as to insure that each train will automatically assume and transmit an equal one twelfth part of the entire torque load. It includes a low speed shaft 54, suitably journaled in a forward housing portion 50, and supporting a large internal gear 57 rotatable therewith. In this instance the gear 57 is carried by a drum 55 secured to a disk 56 provided on the inner end of the shaft 54.

Twelve pinions 58 carried by separate hollow shafts 59 mesh with the gear 57. Each of the shafts 59 is journaled adjacent its rear end in a supporting disk 53 releasably secured between the forward and rear housing portions 50 and 51. The forward ends of the respective shafts 59 are journaled in a heavy ring 60 formed on a cylindrical structure 61 bolted or otherwise securely anchored to the supporting disk 53.

Six single helical gears 62 and 62' are fixed, respectively, to the forward ends of alternate shafts 59, the gears 62 constituting a group of three equally spaced gears which mesh with a single helical pinion 63, and the gears 62' constituting a similar group of three meshing with a separate pinion 63'. Fixed to the rear end of each of the other shafts 59 is a single helical gear 64 or 64'. Gears 64 constitute a group of three equally spaced gears meshing with a single helical pinion 65, and gears 64' constitute a similar group of three equally spaced gears meshing with a separate single helical pinion 65'.

The pinions 63 and 63' are shown formed on the forward end of a hollow shaft 66 which is free to float both radially and axially, and the other pinions 65 and 65' are similarly carried by the rear end of a separate hollow shaft 67 which is also free to float in a similar manner.

A high speed shaft 68, extending loosely through the hollow shafts 66 and 67, is journaled at its rear end 69 in the rear housing portion 51 and at its forward end 70 in a bearing 71 fixed in the rear end of the low speed shaft 54. A plurality of pins 72, rockably seated intermediate their ends in a collar 73 on shaft 68, and rockably engaged at their opposite ends in adjacent end flanges 74 on the hollow pinion shafts 66 and 67, respectively, function in a manner similar to the pins 48 of Fig. 2 to provide a flexible driving connection between the shaft 68 and hollow shafts 66 and 67 and to insure that each of the latter assumes an equal one half part of the torque load transmitted through the shaft 68.

Since the single helical gears 62 of one group are of opposite hand with respect to the gears 62' of the adjacent group, and since the hollow pinion shaft 66 is free to float axially, the single helical pinions 63 and 63' react in the manner hereinabove explained to equally divide between these two groups of gears that portion of the torque load assumed by the pinion shaft 66. Also, since both pinions 63 and 63' are free float radially, that portion of the load assumed by each group of gears is equally divided between the three gears of each group. Therefore, each of the six gears 63 and 63', as well as the pinions 58 with which they are separately connected, sustains an equal one sixth part of that portion of the load transmitted through the pinion shaft 66. Likewise, each of the six gears 64 and 64', as well as the pinions 58 with which they are separately connected, sustains an equal one sixth part of the torque load transmitted through the hollow pinion shaft 67.

Consequently each of the pinions and gears included in the gear set shown in Fig. 3 may be safely designed to transmit only one twelfth of the total torque load transmitted by the set.

In the gear set shown in Fig. 3 provision is made for accurately relating the several helical gears 62, 62', 64 and 64', so as to reduce to a minimum the radial or axial displacement of the pinions 63, 63', 65 and 65' normally required to insure the above described equal divisions of the total torque load. For this purpose each of the several helical gears is mounted for rotative adjustment relative to its supporting shaft 59, suitable means being provided for securely locking the same in any position of adjustment.

In this instance one end of each shaft 59 is reduced, as at 75, to form a shoulder having a tapered seat 76 fashioned to match an inwardly tapered surface 77 formal in the hub 78 of the supported gear. A clamp ring 79, seated on the reduced portion 75 and in splined engagement therewith, is provided with an oppositely tapered seat 80 adapted to match a second inwardly tapered surface 81 formed in the gear hub. The ring 79 is fixed to a head 82 having a stem 83 extending therefrom lengthwise through the hollow shaft 59. Any suitable means, such as a nut 84 on the stem and coacting with the end of the shaft, may be employed to draw the clamp ring 79 into tight wedging engagement within the gear hub 78 with sufficient pressure to substantially lock the hub in engagement with the ring 79 and shoulder 76.

Various changes may be made in any of the embodiments of the invention hereinafter described without departing from or sacrificing the advantages of the invention as defined in the appended claims.

I claim:

1. In a gear set the combination of an internal rotary gear, a pair of pinions interconnected for simultaneous rotation, means including a set of gears each engaged with one of said pinions for connecting the latter in driving relation with said gear, and means including a separate set of gears each engaged with the other of said pinions for separately connecting the latter in driving relation with said gear.

2. In a gear set the combination of an internal rotary gear, a pair of pinions interconnected for simultaneous rotation, a set of gears each engaged with one of said pinions, a second set of gears each engaged with the other of said pinions, a plurality of pinions each engaged with said first named gear, and separate driving connections between each of said last named pinions and a gear of one of said sets.

3. In a gear set the combination of an internal rotary gear, two sets of gears, a plurality of pinions separately engaged with said first named gear, each of said pinions being connected in driving relation with one of said last named gears, and a pair of interconnected pinions each engaged with the gears of one of said sets and reacting thereon to distribute the torque load between said last named gears.

4. In a gear set the combination of an internal rotary gear, a plurality of gears separately connected in driving relation with said first named gear, said gears being arranged in sets, and a plurality of pinions each separately engaged with the gears of one of said sets, said pinions being interconnected for simultaneous rotation and reacting on said last named gears to distribute the torque load between the latter.

5. In a gear set the combination of a plurality of gears arranged in sets, an internal rotary gear separately connected in driving relation with said gears, and a plurality of pinions interconnected for simultaneous rotation, each of said pinions being separately engaged with the gears of one of said sets and reacting thereon to distribute between said gears the torque load imposed on said means.

6. In a gear set the combination of a plurality of gears arranged in sets of three gears each, an internal rotary gear connected in driving relation therewith, and a plurality of pinions interconnected for simultaneous rotation, each of said pinions being separately engaged with the gears of one of said sets and reacting thereon to distribute between said sets the torque imposed on said means, and said pinions being free to float substantially radially to thereby distribute between the gears of each set the torque load imposed on the pinion engaged therewith.

7. In a gear set the combination of a plurality of gears arranged in sets of three gears each, an internal rotary gear separately connected in driving relation with said gears, a plurality of pinions each engaged with three gears of a set, a torque transmitting member, and driving connections between said member and pinions reacting on the latter to distribute betwen said pinions the torque imposed on said member, said pinions being free to float substantially radially to thereby distribute between the gears of each set the torque load imposed on the pinion engaged therewith.

8. In a gear set the combination of a set of three single helical gears, a second set of three single helical gears of opposite hand, an internal rotary gear separately connected in driving relation with each of said gears, and a pair of pinions interconnected for simultaneous rotation, each said pinions being engaged with the gears of one of said sets, said pinions being free to float axially and reacting under the torque load on said means to distribute the load between said gear sets, and said pinions being free to float radially to distribute the load between the three gears of each set.

9. In a gear set the combination of an internal rotary gear, a set of three single helical gears separately connected in driving relation with said first named gear, a second set of three single helical gears separately connected in driving relation with said first named gear, and a pair of single helical pinions having helix angles of opposite hand, each of said pinions meshing with the gears of one of said sets, said pinions being free to move both axially and radially so as to distribute between the gears of said sets the load imposed by the torque load on said first named gear.

10. In a gear set the combination of an internal rotary gear, two sets of three single helical gears, a plurality of pinions each engaged with said first named gear and connected in driving relation with one of said last named gears, and two single helical pinions having helix angles of opposite hand and each engaged with the gears of one of said sets, said pinions being free to move both axially and radially to distribute the transmitted torque load between the gears of said sets.

11. A gear set having two sets of three gears arranged about a common center, a pair of centrally disposed floating gears each engaged with the gears of one of said sets, means interconnecting said pair of gears for simultaneous rotation while permitting the same to float relative to said first named gears, and an internal rotary gear separately connected in driving relation with each of the gears of said sets.

12. In a gear set the combination of a torque transmitting member, four sets of gears, each of said gears being separately connected in driving relation with said member, two pairs of pinions, each of said pinions being engaged with the gears of one of said sets, and means connecting said pinions for simultaneous rotation.

13. In a gear set the combination of a torque transmitting member, four sets of gears, each of said gears being separately connected in driving relation with said member, two pairs of pinions, each of said pinions being engaged with the gears of one of said sets, and means for connecting said pinions for simultaneous rotation and for distributing the torque load therebetween thereby to divide the torque load between said gear sets.

14. In a gear set the combination of a torque transmitting member, four sets of gears, each of said gears being separately connected in driving relation with said member, two pairs of pinions, each of said pinions being engaged with the gears of one of said sets and radially yieldable to distribute the torque load between the gears with which it is engaged, and means interconnecting said pinions for simultaneous rotation and for distributing the torque load therebetween thereby to divide the torque load between said gear sets.

WALTER P. SCHMITTER.

REFERENCES CITED

The following references are of record in the file of this patent:

UNITED STATES PATENTS

| Number | Name | Date |
| --- | --- | --- |
| 1,061,677 | King | May 13, 1913 |
| 1,417,797 | Cook et al. | May 30, 1922 |
| 1,495,703 | MacFarland | May 27, 1924 |
| 1,740,756 | Weis | Dec. 24, 1929 |
| 1,949,643 | Bannan | Mar. 6, 1934 |
| 1,968,604 | Hertz et al. | July 31, 1934 |